US009820235B2

United States Patent
Zhang et al.

(10) Patent No.: US 9,820,235 B2
(45) Date of Patent: Nov. 14, 2017

(54) POWER MANAGEMENT OF COMMUNICATION DEVICES

(71) Applicant: QUALCOMM Incorporated, San Diego, CA (US)

(72) Inventors: Xiaoru Zhang, Saratoga, CA (US); James Simon Cho, Mountain View, CA (US); Tao-Fei Samuel Ng, Fremont, CA (US); Sreepathy Laxmanbabu Aida, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/209,586

(22) Filed: Jul. 13, 2016

(65) Prior Publication Data
US 2016/0323829 A1    Nov. 3, 2016

Related U.S. Application Data

(63) Continuation of application No. 13/706,279, filed on Dec. 5, 2012, now abandoned.

(51) Int. Cl.
*H04W 52/04* (2009.01)
*G06F 1/32* (2006.01)
(Continued)

(52) U.S. Cl.
CPC .......... *H04W 52/04* (2013.01); *G06F 1/3296* (2013.01); *H04B 7/0452* (2013.01);
(Continued)

(58) Field of Classification Search
CPC . G06F 1/3296; H04W 52/04; H04W 52/0225; H04W 52/028; H04W 52/0222
See application file for complete search history.

(56) References Cited

U.S. PATENT DOCUMENTS

| 7,551,568 B2 | 6/2009 | Jeong et al. |
| 7,979,097 B2 | 7/2011 | Hussain |

(Continued)

FOREIGN PATENT DOCUMENTS

| TW | 201119430 A | 6/2011 |
| WO | 2012066180 A1 | 5/2012 |

(Continued)

OTHER PUBLICATIONS

International Search Report and Written Opinion—PCT/US2013/072327—ISA/EPO—Feb. 21, 2014.
(Continued)

*Primary Examiner* — Thomas Lee
*Assistant Examiner* — Vincent Chang
(74) *Attorney, Agent, or Firm* — Arent Fox, LLP

(57) ABSTRACT

A method for reducing power consumption in a communication device. The method includes determining, by the communication device, that a packet transmitted on a communication medium is not intended for the communication device and estimating a length of the packet. If the length is greater than a first threshold but less than a second threshold, selecting a first group of components of the communication device to which to reduce power. If the length is greater than the second threshold, selecting a second group of components of the communication device to which to reduce power. The second group of components includes the first group of components. The method includes reducing power to the selected group of components.

16 Claims, 8 Drawing Sheets

(51) Int. Cl.
*H04W 52/02* (2009.01)
*H04B 7/0452* (2017.01)

(52) U.S. Cl.
CPC ..... *H04W 52/028* (2013.01); *H04W 52/0222* (2013.01); *H04W 52/0225* (2013.01); *Y02B 60/50* (2013.01)

(56) References Cited

U.S. PATENT DOCUMENTS

| | | | |
|---|---|---|---|
| 8,041,968 | B2 | 10/2011 | Tupman |
| 2006/0072614 | A1 | 4/2006 | Ogiso et al. |
| 2006/0225046 | A1* | 10/2006 | Feekes ............... G06F 9/30145 717/127 |
| 2008/0107054 | A1 | 5/2008 | Parts et al. |
| 2008/0171568 | A1 | 7/2008 | Choi et al. |
| 2010/0232329 | A1 | 9/2010 | Park et al. |
| 2011/0090844 | A1 | 4/2011 | Gong et al. |
| 2011/0194475 | A1* | 8/2011 | Kim ..................... H04L 1/0053 370/311 |
| 2012/0076011 | A1* | 3/2012 | Gobriel ............ H04W 52/0258 370/252 |
| 2012/0135776 | A1 | 5/2012 | Chu et al. |
| 2013/0267182 | A1 | 10/2013 | Brandt |
| 2014/0157017 | A1 | 6/2014 | Zhang et al. |
| 2015/0304951 | A1 | 10/2015 | Zhang |

FOREIGN PATENT DOCUMENTS

| | | |
|---|---|---|
| WO | 2012104749 A1 | 8/2012 |
| WO | 2014088908 | 6/2014 |

OTHER PUBLICATIONS

Taiwan Patent Application No. 102143080 Search report, Apr. 24, 2015, 1 page.
Taiwan Search Report—TW102143080—TIPO—Apr. 24, 2015.
European Search Report—EP17158137—Search Authority—The Hague—Mar. 20, 2017.
Taiwan Search Report—TW104123729—TIPO—Nov. 18, 2016.
Taiwan Search Report—TW104123729—TIPO—Mar. 21, 2017.

* cited by examiner

US 9,820,235 B2

POWER MANAGEMENT OF COMMUNICATION DEVICES

RELATED APPLICATIONS

The present Application for Patent is a Continuation of and claims priority to Non Provisional U.S. application Ser. No. 13/706,279 entitled "Power Management of Communication Devices" filed Dec. 5, 2012, which is assigned to the assignee hereof and hereby expressly incorporated by reference herein for all purposes.

BACKGROUND

Field

Embodiments of the inventive subject matter generally relate to the field of communications, and, more particularly, to power management of communication devices.

Background

Various techniques can be implemented for reducing total power consumption while maintaining normal operation for many communication devices. This reduction of power consumption can be especially important in mobile devices (e.g., smart phones) where there is a limited amount of power that is supplied from a battery. In particular, many developers of mobile devices are attempting to reduce the footprint of the battery so that these devices are thinner and lighter. However, at the same time, these developers do not want to sacrifice performance in order to reduce power consumption for the devices.

SUMMARY

In some embodiments, a method includes processing, at a communication device, a packet received via a communication media. The method also includes reducing, while the packet is being processed, power to at least one component in the communication device, in response to a condition associated with the processing of the packet being satisfied. The method includes restoring power to the at least one component prior to receiving an entirety of the packet at the communication device.

In some embodiments, a method includes processing, at a communication device, a packet via communication media. The method includes reducing, while the packet is being received, power to at least one component in the communication device, in response to a condition being satisfied. The condition includes at least one of detection, during processing of the packet at the communication device, of a destination address in the packet being different than an address of the communication device, and detection, during processing of the packet at the communication device, that the packet includes padded data that is discarded and not processed at the communication device. The method includes restoring power to the at least one unit prior to receiving an entirety of the packet at the communication device.

BRIEF DESCRIPTION OF THE DRAWINGS

The present embodiments may be better understood, and numerous objects, features, and advantages made apparent to those skilled in the art by referencing the accompanying drawings.

DETAILED DESCRIPTION

The description that follows includes exemplary systems, methods, techniques, instruction sequences and computer program products that embody techniques of the present inventive subject matter. However, it is understood that the described embodiments may be practiced without these specific details. For instance, although examples refer to wireless communications, embodiments are applicable to any type of data communication. In other instances, well-known instruction instances, protocols, structures and techniques have not been shown in detail in order not to obfuscate the description.

In some embodiments, different components in a communication device are put into a reduced power state (e.g., a nap state or power saving state) based on predefined criteria to reduce power consumption without reducing the overall performance of the communication device. For example, some embodiments are used to put components of the Baseband processor and Radio for the communication device into a reduced power state for defined time periods. In some embodiments, in a reduced power state, power is not supplied to one or more components in the communication device for the duration of a packet. At or near the end of the packet, the one or more components are again supplied with power (awakening from the nap state). Accordingly, the nap state can be on a per packet basis and is triggered while a packet is being received. There can be multiple triggers in determining whether to place the components into a nap state. Also in some embodiments, there may be three different levels of a reduced power state that depend on the packet length. These three different levels can determine which components are not supplied with power. After or near the end of packet being received, power is restored to these components from which power was removed.

Figure 1:
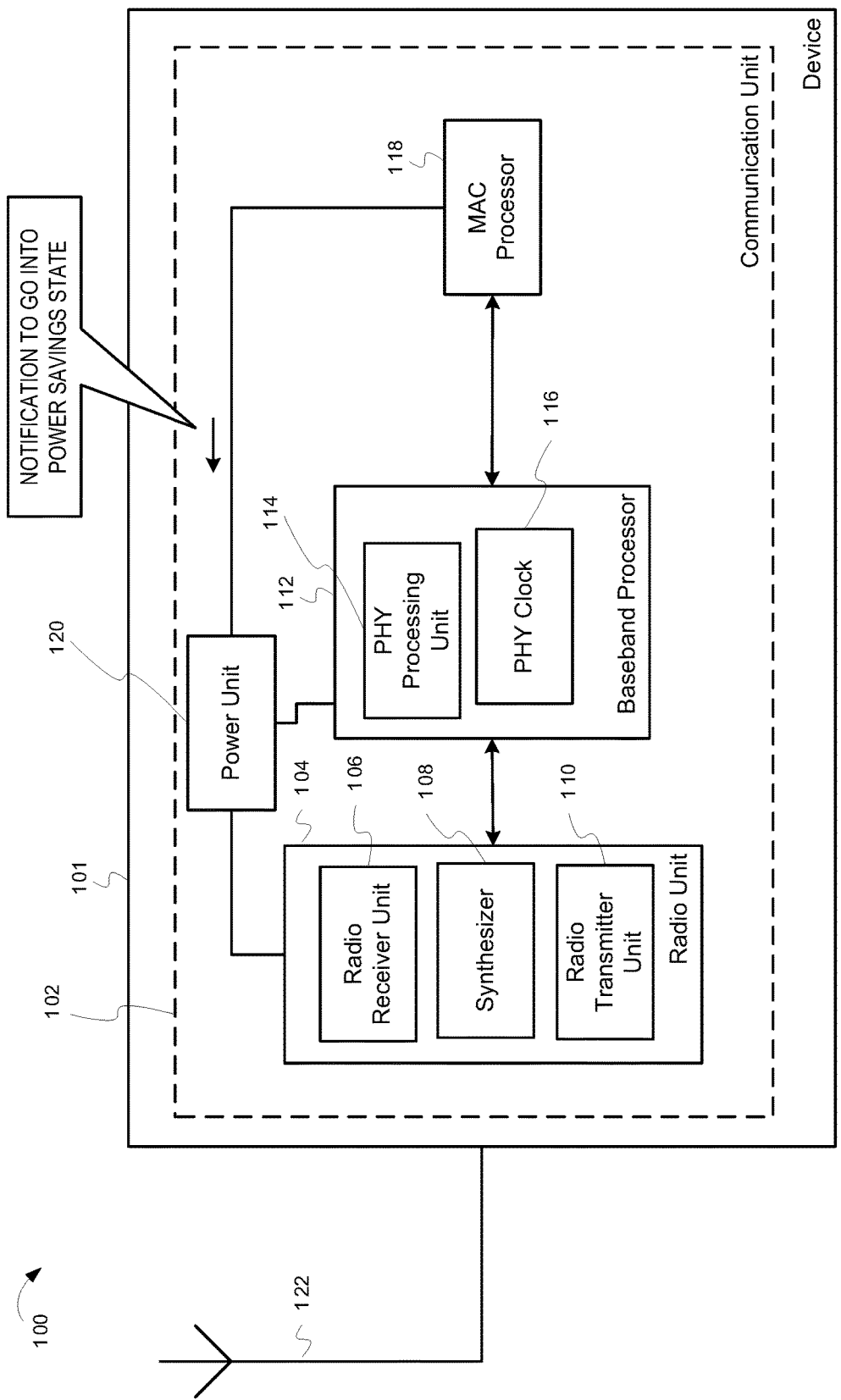
FIG. 1 depicts a block diagram of a system that implements power management, according to some embodiments.

FIG. 1 depicts a block diagram of a system that implements power management, according to some embodiments. In particular, FIG. 1 depicts a system 100 that includes a device 101 that is communicatively coupled to communication media 122. For example, the communication media 122 can be any type of media (e.g., air) for transmission of wireless communication. In some other embodiments, the communication media 122 is not limited to wireless communication. For example, the communication media 122 can be a power line, coaxial cable, telephone line, etc. In this example, the device 101 can be any type of device for receiving and transmitting communication signals.

The device 101 may include a communication unit 102. The communication unit 102 may include units for processing communication signals that are transmitted on and received from the communication media 122. The communication unit 102 may include a radio unit 104, a baseband processor 112, a MAC (Media Access Control) processor 118, and a power unit 120. In some embodiments, the communication unit 102 includes at least two layers of the OSI (Open Systems Interconnection) model (e.g., ISO/IEC 7498-1). In particular, baseband processor 112 may implement at least part of a PHY (physical) layer and the MAC processor 118 may implement at least part of the MAC layer. The radio unit 104 may include a radio receiver unit 106, a synthesizer 108, and a radio transmitter unit 110. The baseband processor 112 may include a PHY processing unit 114 and a PHY clock 116. The PHY processing unit 114 can include a number of units for processing a baseband signal that has been converted into a digital bitstream. The PHY processing unit 114 can also include a number of units for processing a digital bitstream that will be converted into analog form and further processed by the radio unit 104 for transmission as a radio frequency (RF) signal on the communication media 122. Examples of the units in the PHY processing unit 114 can include an Analog to Digital converter (ADC), a Digital to Analog converter (DAC), an inverse Fast Fourier Transform (iFFT) module, a FFT module, an interleaver, a de-interleaver, a decoder, and an encoder. Also, the PHY processing unit 114 can include different volatile machine-readable media. For example, the PHY processing unit 114 can include configuration registers, counters, etc. It is noted, however, that in some implementations the ADC and the DAC may be implemented as interface devices between the radio unit 104 and the baseband processor 112, or within the radio unit 104.

The radio unit 104 is communicatively coupled to the communication media 122 for receiving and transmitting of radio frequency (RF) signals thereon. The radio unit 104 is communicatively coupled to the baseband processor 112, which is communicatively coupled to the MAC processor 118. After receipt of the signals from the radio receiver unit 106 in the radio unit 104, the PHY processing unit 114 generates a number of decoded bits that are separated into packets. The MAC processor 118 receives these decoded bits and processes the packets. As further described below, based on various predefined criteria or triggers, the MAC processor 118 determines whether units in the radio unit 104 and/or units in the baseband processor 112 are placed into a power saving state. Power can be restored to these units at or near the end of a packet based processing of the packet. In particular, as further described below, power can be restored to some of the units prior to but near the end of the packet to allow such units time to be operational prior to receiving a next packet. For example, power is restored to the synthesizer 108 prior to but near the end of the packet to allow a settling time for the synthesizer 108 prior to its operation. Conversely, the power can be restored to other units (e.g., the radio receiver unit 106, the radio transmitter unit 110, etc.) at the end of the packet. Also as further described below, the number of units that are placed into the power saving state can be dependent on the length of the packet (e.g., "short", "medium", and "long"). In particular, in some implementations, the number of units in the device from which power is removed is proportional to a length of the packet. In response to determining that at least one unit is to be placed into a power saving state, the MAC processor 118 transmits a notification (e.g., a control signal) to the power unit 120. The notification can identify which units are to be placed into the power saving state. The power unit 120 then removes the supply of power or gates off the power to the units that are identified. Also, after the end of the packet is detected or near the end of the packet, the MAC processor 118 transmits another notification to restore power to these units. A more detailed description of these operations is set forth below.

Figure 2:
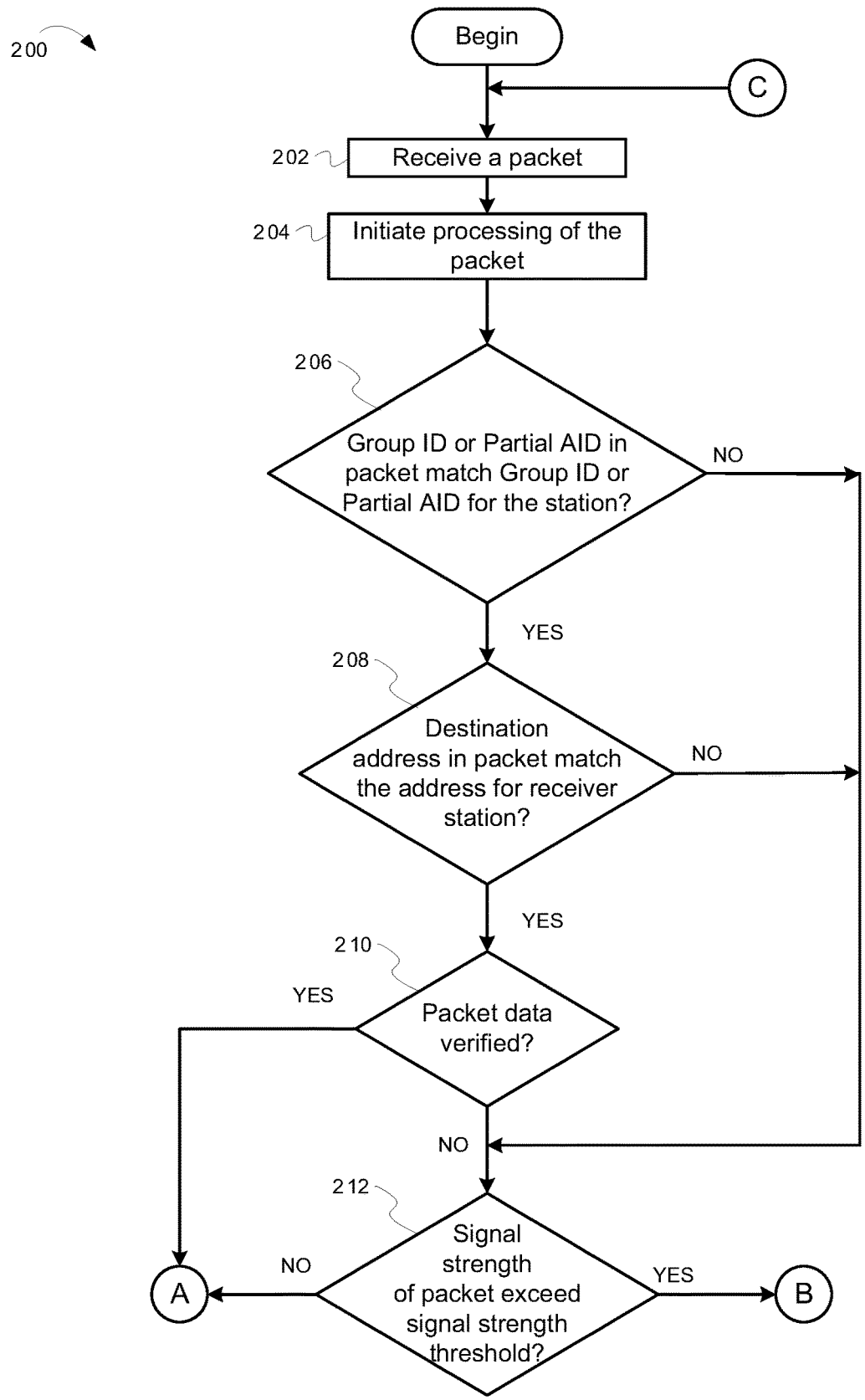
FIG. 2 depicts a first portion of a flowchart illustrating example operations for determining when to enter a power saving state in a device, according to some embodiments.
Figure 3:
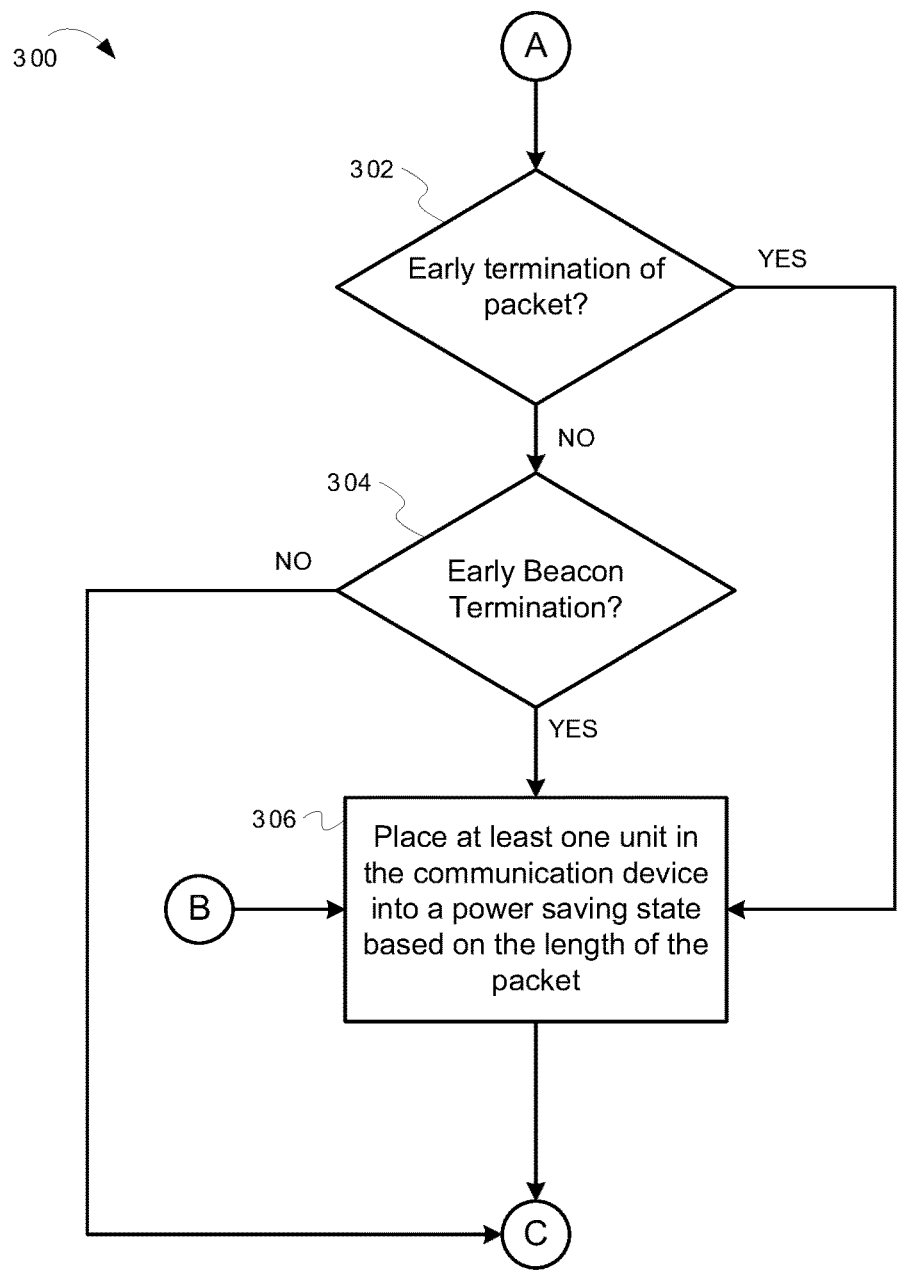
FIG. 3 depicts a second portion of a flowchart illustrating example operations for determining when to enter a power saving state in a device, according to some embodiments.

FIGS. 2-3 depict flowcharts illustrating examples operations for determining when to enter a power saving state in a device, according to some embodiments. The operations of a flowchart 200 and a flowchart 300 are described in reference to FIG. 1. The operations of the flowchart 200 and the flowchart 300 are performed together and continue between each other as defined by transition points A, B and C. The operations of the flowcharts 200-300 may be performed by the MAC processor and/or some of the other components depicted in FIG. 1. The operations of the flowcharts 200-300 begin at block 202 of FIG. 2.

At block 202, the communication unit 102 of the device 101 receives a packet. In particular, the MAC processor 118 receives data in a packet after the radio receiver unit 106 receives the signals from the communication media 122 and the PHY processing unit 114 generates the decoded bits based on the signals. Operations of the flowchart 200 continue at block 204.

At block 204, the MAC processor 118 initiates processing of the packet. The MAC processor 118 can locate the preamble and payload of the packet and begin processing of the different fields therein. Operations of the flowchart 200 continue at block 206.

At block 206, the MAC processor 118 determines whether a Group ID (GID) or a partial AID (Association ID) in the preamble of the packet matches the Group ID or partial AID, respectively, assigned to the device 101. In some embodiments, the preamble of the packet includes the Group ID or partial AID for wireless communications based on the 802.11ac protocol. In particular, for individual-user transmission, the device 101 is assigned a unique AID for its MAC address relative to other devices that are part of the same network. For individual-user transmission, the ID field in the preamble may store a truncated number of bits of the AID—a partial AID. For multi-user transmission, a GID may be assigned to multiple devices or stations that are to receive and process the packet. Therefore for multi-user transmission, the ID field in the preamble may store the GID such that the MAC processor 118 can locate this ID field in the preamble of the packet. The MAC processor 118 can then determine whether the value in this ID field in the preamble (either the GID or partial AID) matches the GID or partial AID, respectively, assigned to the device 101. If there is a match, operations of the flowchart 200 continue at block 212. Otherwise, operations of the flowchart 200 continue at block 208.

At block 208, the MAC processor 118 determines whether the destination address in the packet matches the address for the device receiving the packet. In some embodiments, the destination address is the Media Access Control (MAC) address. Also for this determination by the MAC processor 118, examples of the type of protocols associated with the packet can include 802.11g, 802.11n, 802.11ac, etc. compliant protocols In some situations, the partial AID for a communication device is not completely unique. Therefore in these situations, the partial AID for the packet may match the partial AID for the communication device even though the destination address stored in the packet does not match the address of the communication device. Also, the destination address may be processed at a later point in time than the partial AID for a packet. Therefore in some embodiments, the MAC processor 118 may first process the partial AID and determine that it matches the partial AID for the communication device. Subsequently, the MAC processor 118 may process the destination address in the packet and determine that it does not match the address for the communication device. Accordingly in these situations, the MAC processor 118 determines that the packet is not destined for the communication device at a later point in the packet in comparison to checking the partial AID for the packet. If there is a match, operations of the flowchart 200 continue at block 212. Otherwise, operations of the flowchart 200 continue at block 210.

At block 210, the MAC processor 118 determines whether the data in the packet is verified. For example, delimiters can be positioned between the packets that are transmitted. These delimiters can include a Cyclic Redundancy Check (CRC) value for the packet. Upon receipt, the MAC processor 118 can perform a function (e.g., hash) across at least a portion of the data in the packet. If a result of the function does not equal the CRC value, the MAC processor 118 can determine that the data in the packet cannot be verified. If this packet is not destined for the communication device, the CRC value cannot be validated. Therefore, if the CRC value is not validated, the MAC processor 118 determines that the packet is not destined for this communication device, thereby allowing units in the communication device 101 to be placed into a power saving state (as further described below). If the data in the packet is not verified, operations of the flowchart 200 continue at block 212. Otherwise, operations of the flowchart 200 continue at transition point A, which continues at the transition point A of the flowchart 300 of FIG. 3.

At block 212, the MAC processor 118 determines whether the signal strength of the packet exceeds a signal strength threshold. Therefore as depicted in the flowchart 200, if there is a mismatch in the Group ID or Partial AID, a mismatch in the destination address, or the packet data cannot be verified, the MAC processor 118 performs this additional check regarding the strength of the signal for the packet. If the signal strength of the current packet is strong, the MAC processor 118 assumes that any other transmission after the current packet cannot be processed. Therefore, the MAC processor 118 will proceed with placing units in the communication device 101 into a power saving state for each of these three conditions. However, if the signal strength of the current packet is not as strong and the current packet is not to be processed, the MAC processor 118 can initiate searching for the next packet in the data transmission (assuming the early termination conditions are not satisfied as further described below (see description of blocks 302 and 304 below). In other words, the MAC processor 118 would initiate searching for the next packet in the data transmission, instead of placing units in the communication device 101 into a power saving state (as further described below). In some embodiments, the signal strength is measured based on RSSI (Received Signal Strength Indication) of the signal. The signal strength threshold can vary depending on the media used for communication, the amount of noise in the media, etc. If RSSI is used, the RSSI threshold can be 30 dB, 20 dB, etc. The value of the RSSI threshold can vary depending on the media used for communication, the amount of noise in the media, etc. If the signal strength of the packet does not exceed the signal strength threshold, operations of the flowchart 200 continue at transition point A, which continues at the transition point A of the flowchart 300 of FIG. 3. Otherwise, operations of the flowchart 200 continue at transition point B, which continues at the transition point B of the flowchart 300 of FIG. 3.

The operations of the flowchart 300 of FIG. 3 are now described. From transition point A, operations of the flowchart 300 continue at block 302.

At block 302, the MAC processor 118 determines whether there is an early termination of the packet. In particular, while the packet is still being received by the communication device, the payload of the packet may not be carrying data that is to be processed (e.g., padded data). For example in some embodiments, a communication device (either receiver or transmitter) is configured as to operate as Multi-User, Multiple Input, Multiple Output (MU-MIMO). In this configuration, the communication device uses multiple antennas for data receipt and transmission. Additionally, MU-MIMO enables the communication device to transmit and receive data to and from multiple users. In some transmissions using MU-MIMO, some communication devices will have less data to receive than other communication devices for the transmission. For those communication devices that have less data to receive during the transmission, the time that they receive data to process can end early in comparison to the time of transmission using MU-MIMO. For communication devices that stop receiving data early, the transmitter inserts zero length delimiters (e.g., repeating four bytes) into the payload of the packet. In other words, the payload of the packet includes padding that indicates there is no more data to be processed in the packet. If there is early termination, operations of the flowchart 300 continue at block 306. Otherwise, operations of the flowchart 300 continue at block 304.

At block 304, the MAC processor 118 determines whether there is an early beacon termination. In particular, an Access Point can periodically send a beacon (e.g., 100 milliseconds) to its communication devices to allow the communication devices that are sleeping to wake up at this periodic interval. The beacon will indicate notification of downlink packets to the communication devices that were in a sleep state. The beacon includes a TIM (Traffic Indication Map) value. If this value is set for a particular communication device receiving the beacon, this is notification to the communication device that there are packets destined for this communication device. Therefore, if the TIM value in the beacon is not set, then the communication device could return to a sleep state (power saving state). Accordingly, upon receipt of a beacon where the TIM value is not set, the MAC processor can cause units in the communication device 101 to enter into a power saving state (without waiting for the entire beacon to be retrieved and processed). If there is an early beacon termination, operations of the flowchart 300 continue at block 306. Otherwise, operations of the flowchart 300 continue at transition point C, which continues at transition point C in the flowchart 200 (where a next packet is received). Accordingly, if any of the five conditions shown in the flowcharts 200-300 is satisfied, operations of the flowcharts 200-300 continue at block 306 (for entering into a power saving state based on the length of the packet). In particular, the five conditions shown in the flowcharts 200-300 include the following:

1. Group ID or partial AID mismatch and signal strength threshold exceeded (see blocks 206 and 212),
2. destination address mismatch and signal strength threshold exceeded (see blocks 208 and 212), 3. packet data not verified and signal strength threshold exceeded (see blocks 210 and 212),
4. early termination of the packet (see block 302), and
5. early beacon termination (see block 304).

At block 306, the MAC processor 118 places at least one unit in the communication device 101 into a power saving state based on the length of the packet. In particular, the MAC processor 118 sends a notification to the power unit 120 that include identification of the units to be placed into a power saving state. The power unit 120 can then remove or gate off power to these units that are identified, until or near the end of the packet. The particular units that are placed into a power saving state can be based on the length of the packet. The entering into the power saving state can include a removal of power to the units. This operation of entering to a power saving state is further described in the flowcharts in FIGS. 4-6 (which are now described). After the power saving state is complete (e.g., end of packet), operations of the flowchart 300 continue at transition point C, which continue at transition point C in the flowchart 200 (where a next packet is received).

Figure 4:
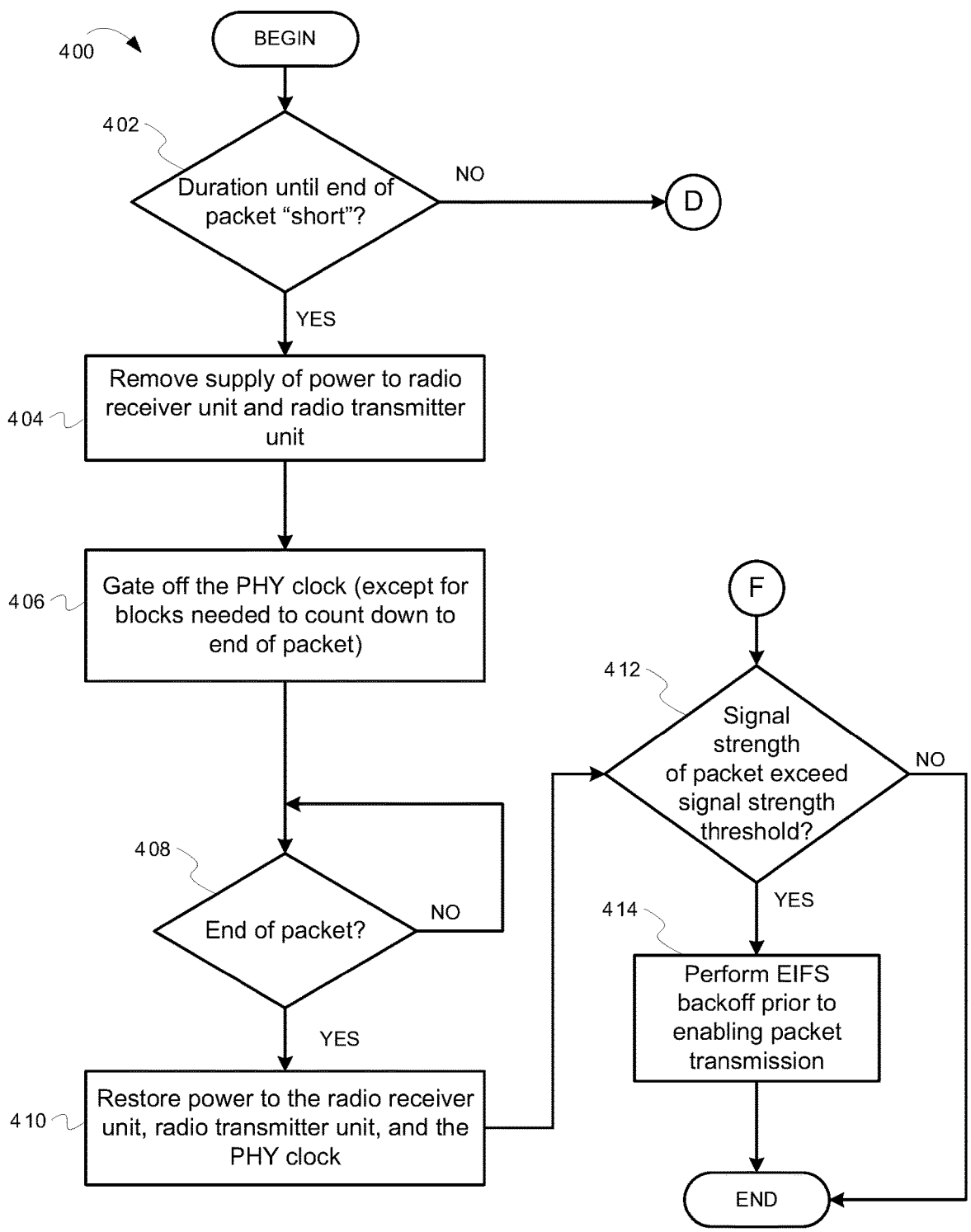
FIG. 4 depicts a first portion of a flowchart illustrating example operations for placing units in a communication device into a power saving state based on the length of the received packet, according to some embodiments.
Figure 5:
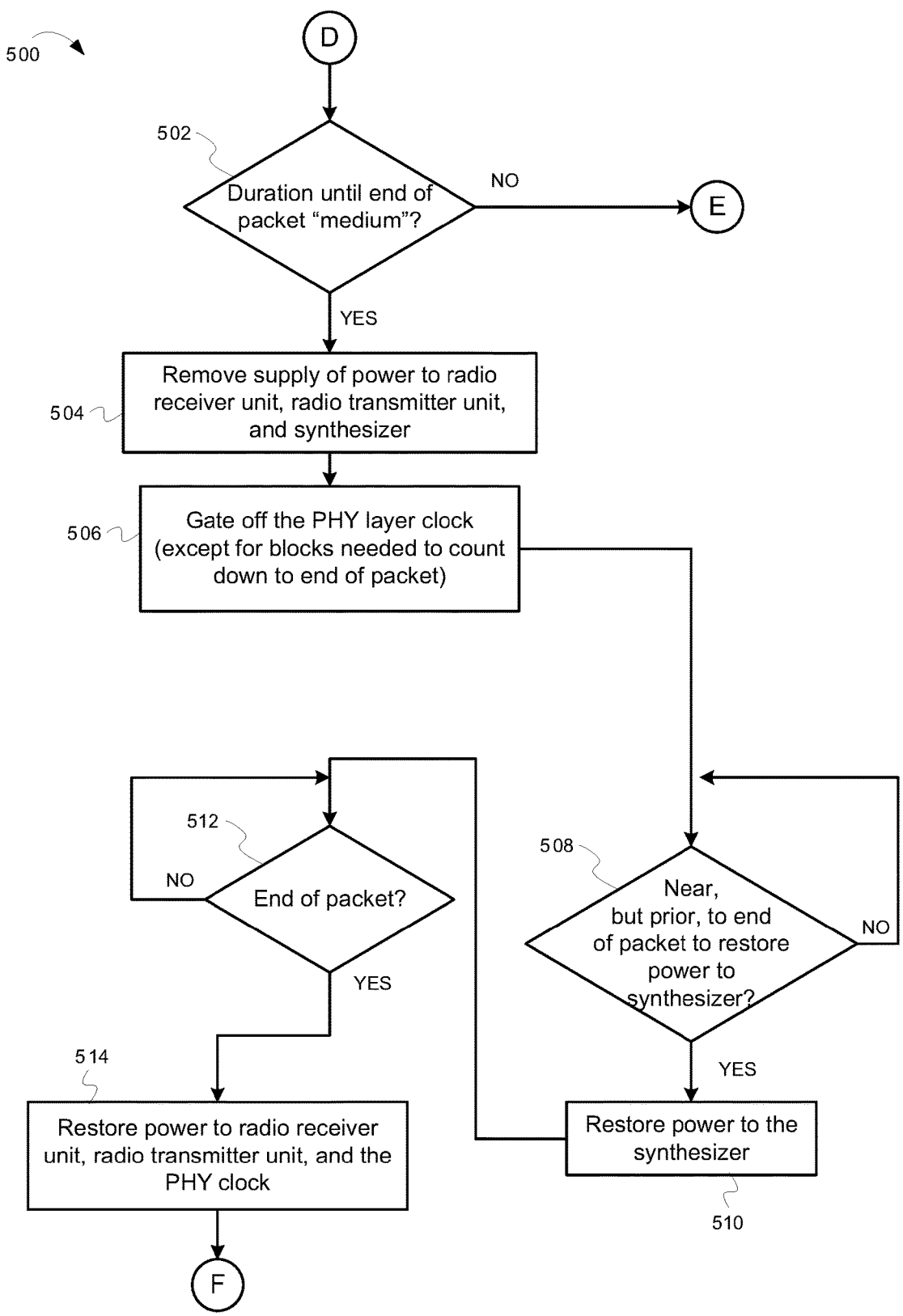
FIG. 5 depicts a second portion of the flowchart illustrating example operations for placing units in a communication device into a power saving state based on the length of the received packet, according to some embodiments.
Figure 6:
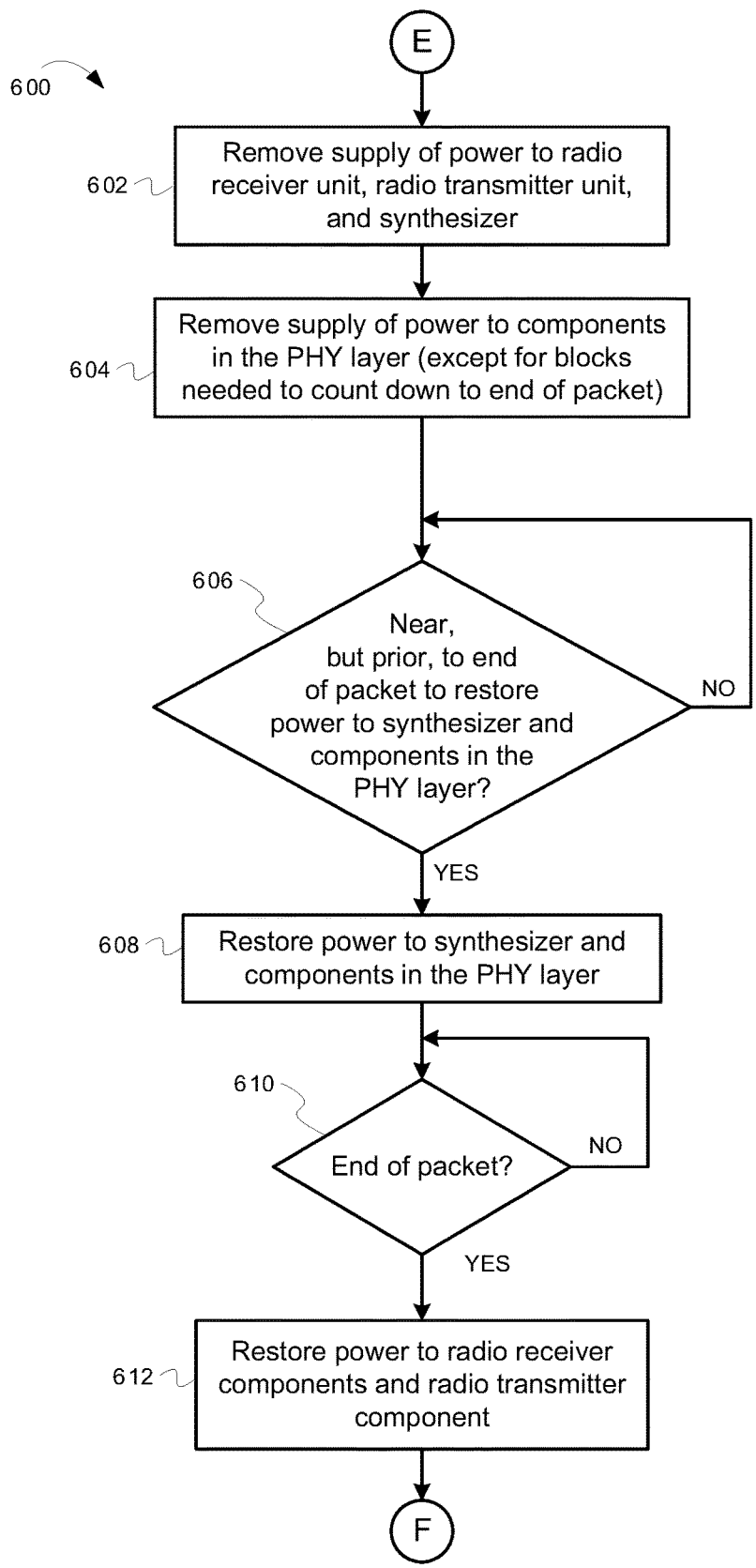
FIG. 6 depicts a third portion of the flowchart illustrating example operations for placing units in a communication device into a power saving state based on the length of the received packet, according to some embodiments.

FIGS. 4-6 depict flowcharts illustrating examples operations for placing units in a communication device into a power saving state based on length of received packet, according to some embodiments. The operations of a flowchart 400, a flowchart 500, and a flowchart 600 are described in reference to FIG. 1. The operations of the flowchart 400, the flowchart 500, and the flowchart 600 are performed together and continue among each other as defined by transition points D, E, and F. The operations of the flowcharts 400-600 may be performed by the units depicted in FIG. 1. The operations of the flowcharts 400-600 begin at block 402 of FIG. 4.

At block 402, the MAC processor 118 determines whether the duration until the end of the packet is "short". In some embodiments, the duration until the end of the packet being "short" is defined relative to the settling time of the synthesizer 108 in the radio unit 104. In particular, the synthesizer 108 may require a settling time after being powered on but prior to its use. The settling time for a synthesizer can vary among chips or integrated circuits (e.g., 15 microseconds). The PHY processing unit 114 determines the length of the packet based on the length field in the preamble of the packet. The PHY processing unit 114 can also determine the length of the packet that has not yet been received by the radio receiver unit 106. The PHY processing unit 114 can also determine the duration until the end of the packet is received by the radio receiver unit 106 based on the length of the packet that has not yet been received. The PHY processing unit 114 can transmit this duration until the end of the packet and the settling time of the synthesizer 108 to the MAC processor 118. If the duration until the end of the packet may be less than the settling time of the synthesizer 108, the MAC processor 118 determines that the duration until the end of the packet is "short". If the duration until the end of the packet is not "short", operations of the flowchart 400 at transition point D, which continues at transition point D of the flowchart 500 where a determination is made of whether the duration until the end of the packet is "medium" (which is further described below). If the duration until the end of the packet is "short", operations of the flowchart 400 continue at block 404.

At block 404, the supply of power to the radio receiver unit 106 and the radio transmitter unit 110 is removed. For example, with reference to FIG. 1, the MAC processor 118 can transmit a message to the power unit 120 to remove the supply of power to the radio receiver unit 106 and the radio transmitter unit 110. The power unit 120 can then shut off power to the radio receiver unit 106 and the radio transmitter unit 110. Operations of the flowchart 400 continue at block 406.

At block 406, the PHY clock (except for blocks needed to count down to the end of the packet) is gated off. In particular, the PHY clock 116 can be partitioned such that a portion can continue to count down to the end of the packet, even though the PHY clock 116 is gated off in other portions. For example, with reference to FIG. 1, the MAC processor 118 can transmit a message to the power unit 120 to gate off the PHY clock 116. Power to the PHY clock 116 can still be supplied, but the PHY clock itself is gated off In this situation where the duration of the packet is considered "short", the supply of power continues to be supplied to the synthesizer 108 because the settling time for the synthesizer 108 after receiving power is greater than the duration to the end of the packet. Operations of the flowchart 400 continue at block 408.

At block 408, the MAC processor 118 determines whether the end of the packet has been received based on the lapse of time. The MAC processor 118 can make this determination based on duration until the end of packet provided by the PHY processing unit 114 (as described above). If the end of the packet has not yet been reached, operations of the flowchart 400 remain at the block 408. However if the end of the packet has been reached, operations of the flowchart 400 continue at block 410.

At block 410, the supply of power to the radio receiver unit, the radio transmitter unit, and the PHY clock is restored. For example, with reference to FIG. 1, the MAC processor 118 can transmit a message to the power unit 120 to restore the supply of power to the radio receiver unit 106, the radio transmitter unit 110, and the PHY clock 116. In response, the power unit 120 restores power to the radio receiver unit 106, the radio transmitter unit 110, and the PHY clock 116. Operations of the flowchart 400 continue at block 412.

At block 412, the MAC processor 118 determines whether the signal strength of the packet exceeds a signal strength threshold. For communication devices that enter a power saving state where the packet is not successfully received and processed, an EIFS (Error InterFrame Spacing) backoff is performed for a packet having a signal strength that exceeds the signal strength threshold. In particular, after receiving a packet, the communication device can respond with an acknowledgement packet. The system is configured to ensure that transmission from a different communication device does not collide with transmission of the acknowledgement packet. However, the communication device may enter into a power saving state prior to receiving and processing a duration field in the preamble of the packet that defines the length of time to wait prior to transmitting a packet (in order to avoid colliding with the acknowledgement packet). Therefore in this situation, the communication device does not know the length of time to wait prior to transmitting. Therefore in some embodiments for packets that are not successfully received or processed, the communication device is required to wait a length of time defined by an EIFS backoff to ensure that the communication device does not transmit a packet that collides with the acknowledgement packet. The MAC processor 118 can then perform a countdown starting at the value of the EIFS backoff and will not perform a transmission until the countdown reaches zero (see block 414 described below). If the signal strength of the packet does not exceed the signal strength threshold, operations of the flowcharts 400-600 are complete along this path. However, if the signal strength of the packet does exceed the signal strength threshold, operations continue at block 414.

At block 414, the MAC processor 118 performs an EIFS backoff prior to enabling packet transmission. As described above, the MAC processor 118 performs this operation to ensure that the communication device 101 does not transmit a packet until after the EIFS back as expired. This EIFS backoff ensures that a packet transmission from the communication device 101 does not collide with transmission of the acknowledgement packet for the packet. Operations of the flowcharts 400-600 are complete along this path.

The operations of the flowchart 500 of FIG. 5 are now described. From transition point D, operations of the flowchart 500 continue at block 502. In particular, if this path in the flowcharts 400-600 has been reached, the duration until the end of the packet is not "short" and will be defined as either "medium" or "long". The flowchart 500 include operations to determine whether the duration until the end of the packet is "medium" and operations performed if the duration until the end of the packet is "medium".

At block 502, the MAC processor 118 determines whether the duration until the end of the packet is "medium". In particular because the duration is not considered "short", the MAC processor 118 is determining whether the duration until the end of the packet is either "medium" or "long". If the duration until the end of the packet is not "medium", the MAC processor 118 enters into a power saving state based on the assumption that the duration until the end of the packet is "long" (these operations are described in more detail below in reference to the flowchart 600). In some embodiments, the MAC processor 118 determines whether the duration until the end of the packet is either "medium" or "long" based on the time to restore the necessary states in the PHY layer after power has been removed from the PHY layer. As further described below if the duration until the end of the packet is "long", power is removed from the PHY layer. Accordingly, necessary states in the PHY layer are required to be restored prior to operation. With reference to FIG. 1, the necessary states in the PHY layer can include values stored in configuration registers, counters, etc. in the baseband processor 112, states of the units in the PHY processing unit 114 to enable their operations, etc. Therefore, the MAC processor 118 determines the time to restore the necessary states in the PHY layer after power has been removed. The PHY processing unit 114 also determines the length of the packet based on the length field in the preamble of the packet. The PHY processing unit 114 can also determine the length of the packet that has not yet been received by the radio receiver unit 106. The PHY processing unit 114 can also determine the duration until the end of the packet is received by the radio receiver unit 106 based on the length of the packet that has not yet been received. The PHY processing unit 114 can transmit this duration until the end of the packet and the time to restore the necessary states in the PHY layer to the MAC processor 118. If the duration until the end of the packet is less than the time to restore the necessary states in the PHY layer, the MAC processor 118 determines that the duration until the end of the packet is "medium". If the duration until the end of the packet is not "medium", operations of the flowchart 400 at transition point E, which continues at transition point E of the flowchart 600 (which is further described below). If the duration until the end of the packet is "medium", operations of the flowchart 500 continue at block 504.

At block 504, the supply of power to the radio receiver unit 106, the radio transmitter unit 110, and the synthesizer 108 is removed. For example, with reference to FIG. 1, the MAC processor 118 can transmit a message to the power unit 120 to remove the supply of power to the radio receiver unit 106 the radio transmitter unit 110, and the synthesizer 108. The power unit 120 can then shut off power to the radio receiver unit 106, the radio transmitter unit 110, and the synthesizer 108. Operations of the flowchart 500 continue at block 506.

At block 506, the PHY clock (except for blocks needed to count down to the end of the packet) is gated off. In particular, the PHY clock 116 can be partitioned such that a portion can continue to count down to the end of the packet, even though the PHY clock 116 is gated off in other portions. For example, with reference to FIG. 1, the MAC processor 118 can transmit a message to the power unit 120 to gate off the PHY clock 116. Operations of the flowchart 500 continue at block 508.

At block 508, the MAC processor 118 determines whether the end of packet is near (but prior to the end) such that there is time to restore power to the synthesizer prior to the next packet being received. In particular as described above, the synthesizer 108 requires a settling time after being powered on but prior to its use. The settling time for a synthesizer can vary among chips (e.g., 15 microseconds). Accordingly, the MAC processor 118 determines a time prior to the end of the packet that power is needed by the synthesizer 108 to settle prior to its operation. If this point near the end of the packet (defined relative to the settling time for the synthesizer 108) has not yet been reached, operations remain at block 508 where this determination is again made. If this point near the end of the packet has been reached, operations of the flowchart 500 continue at block 510.

At block 510, the supply of power to the synthesizer is restored. For example, with reference to FIG. 1, the MAC processor 118 can transmit a message to the power unit 120 to restore the supply of power to the synthesizer 108. In response, the power unit 120 restores power to the synthesizer 108. Operations of the flowchart 500 continue at block 512.

At block 512, the MAC processor 118 determines whether the end of the packet has been received based on the lapse of time. The MAC processor 118 can make this determination based on duration until the end of packet provided by the PHY processing unit 114 (as described above). If the end of the packet has not yet been reached, operations of the flowchart 500 remain at the block 512. However if the end of the packet has been reached, operations of the flowchart 500 continue at block 514.

At block 514, the supply of power to the radio receiver unit, the radio transmitter unit, and the PHY clock is restored. For example, with reference to FIG. 1, the MAC processor 118 can transmit a message to the power unit 120 to restore the supply of power to the radio receiver unit 106, the radio transmitter unit 110, and the PHY clock 116. In response, the power unit 120 restores power to the radio receiver unit 106, the radio transmitter unit 110, and the PHY clock 116. Operations of the flowchart 500 continue at transition point F, which continues at transition point F of the flowchart 400 the determination is made of whether the signal strength of the packet exceeds the signal strength threshold at block 412.

The operations of the flowchart 600 of FIG. 6 are now described. From transition point E, operations of the flowchart 600 continue at block 602. In particular, if this path in the flowcharts 400-600 has been reached, the duration until the end of the packet is assumed to be "long".

At block 602, the supply of power to the radio receiver unit 106, the radio transmitter unit 110, and the synthesizer 108 is removed. For example, with reference to FIG. 1, the MAC processor 118 can transmit a message to the power unit 120 to remove the supply of power to the radio receiver unit 106 the radio transmitter unit 110, and the synthesizer 108. The power unit 120 can then shut off power to the radio receiver unit 106, the radio transmitter unit 110, and the synthesizer 108. Operations of the flowchart 600 continue at block 604.

At block 604, the supply of power to the units in the PHY layer (except for blocks needed to count down to the end of the packet) is removed. For example, with reference to FIG. 1, the MAC processor 118 can transmit a message to the power unit 120 to remove power supplied to the baseband processor 112. This is in contrast to just gating off the PHY clock (which occurs if duration until the end of the packet is "short" or "medium". Operations of the flowchart 600 continue at block 606.

At block 606, the MAC processor 118 determines whether the end of packet is near (but prior to the end) such that there is time to restore power to the synthesizer and units in the baseband processor 112 prior to the next packet being received. In particular as described above, the synthesizer 108 requires a settling time after being powered on but prior to its use. The settling time for a synthesizer can vary among chips (e.g., 15 microseconds). Also, the necessary states in the PHY layer are required to be restored prior to operations of the units therein. Accordingly, the MAC processor 118 determines a time prior to the end of the packet that power is needed by the synthesizer 108 to settle and the necessary states in the PHY layer to be restored prior to its operation. If this point near the end of the packet has not yet been reached, operations remain at block 606 where this determination is again made. If this point near the end of the packet has been reached, operations of the flowchart 600 continue at block 608.

At block 608, the supply of power to the synthesizer and the units in the PHY layer is restored. For example, with reference to FIG. 1, the MAC processor 118 can transmit a message to the power unit 120 to restore the supply of power to the synthesizer 108 and the units in the PHY layer (e.g., PHY processing unit 114 and the PHY clock 116). In response, the power unit 120 restores power to the synthesizer 108 and the units in the PHY layer. In some embodiments, the power unit 120 restores power to the units in the PHY layer first. Accordingly, the necessary states in the PHY layer can be restored while the synthesizer 108 is settling. Operations of the flowchart 600 continue at block 610.

At block 610, the MAC processor 118 determines whether the end of the packet has been received based on the lapse of time. The MAC processor 118 can make this determination based on duration until the end of packet provided by the PHY processing unit 114 (as described above). If the end of the packet has not yet been reached, operations of the flowchart 600 remain at the block 610. However if the end of the packet has been reached, operations of the flowchart 600 continue at block 612.

At block 612, the supply of power to the radio receiver unit, the radio transmitter unit, and the PHY clock is restored. For example, with reference to FIG. 1, the MAC processor 118 can transmit a message to the power unit 120 to restore the supply of power to the radio receiver unit 106 and the radio transmitter unit 110. In response, the power unit 120 restores power to the radio receiver unit 106 the radio transmitter unit 110. Operations of the flowchart 600 continue at transition point F, which continues at transition point F of the flowchart 400 the determination is made of whether the signal strength of the packet exceeds the signal strength threshold at block 412.

Figure 7:
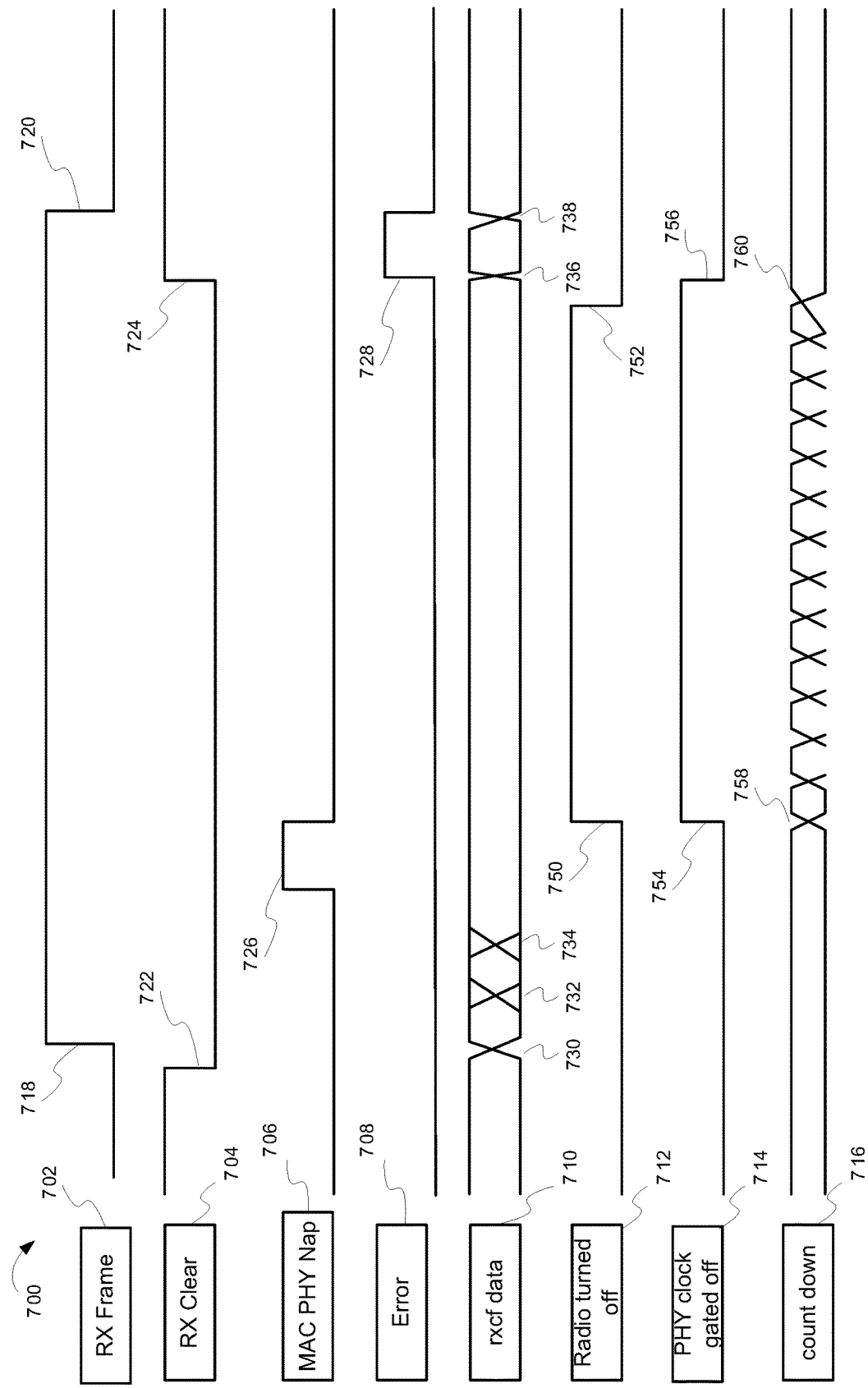
FIG. 7 depicts an example timing diagram of entering a power saving state in a device, according to some embodiments.

FIG. 7 depicts an example timing diagram of entering a power saving state in a device, according to some embodiments. In particular, FIG. 7 depicts an example timing diagram of signals in a device for power saving management when duration until the end of the packet is "short", according to some embodiments. A timing diagram 700 includes handshaking signals between units in the PHY and MAC layers for power saving management. The timing diagram 700 includes an RX frame signal 702, an RX clear signal 704, a MAC PHY nap signal 706, an error signal 708, a rxcf data signal 710, a radio turned off signal 712, a PHY clock gated off signal 714, and a countdown signal 716.

With reference to FIG. 1, the RX frame signal 702 is transmitted from the PHY processing unit 114 to the MAC processor 118. The RX frame signal 702 is asserted to a logic high at a point 718 when a packet is being received. The RX frame signal 702 is de-asserted at a point 720 at the end of the packet.

The RX clear signal 704 is asserted to a logic low at a point 722, which is a time when the packet is still on the communication media 122 (e.g., in the air to be received by the communication device 101) but not yet fully detected by the PHY processing unit 114. Accordingly, the point 722 is early in time in comparison to the point 718. The RX clear signal 704 is de-asserted at a point 724 at the end of the packet is received from the communication media 122.

After determining that units of the PHY layer are to enter a power saving state, the MAC processor 118 asserts a logic high of the MAC PHY nap signal 706 (shown at a point 726). In response (as shown by the radio turned off signal 712), the radio receiver unit 106 and the radio transmitter unit 110 are turned off between points 750 and 752. Similarly in response (as shown by PHY clock gated off signal 714), the PHY clock 116 (except for the portion to remain supplied with power to count down to the end of the packet) is turned off between points 754 and 756. Also in response (as shown by the countdown signal 716), the portion of the PHY clock that remains supplied with power begins counting down to the end of the packet shown between points 758 and 760.

The rxcf data signal 710 includes a number of decoded bits (shown as a bit 730, a bit 732, a bit 734, a bit 736, and a bit 738) that are transmitted from the PHY processing unit 114 to the MAC processor 118. As shown prior to the MAC PHY nap signal 706 being asserted, the PHY processing unit 114 is processing and transmitting decoded bits of the packet to the PHY processing unit 114. This transmission stops until the end of the packet is reached. The PHY processing unit 114 begins retransmitting (shown as bits 736 and 738). The bits 736 and 738 represent the error signal 708 being asserted a logic high. In particular, when the end of the packet is reached, the PHY processing unit 114 asserts a logic high of the error signal 708 at point 728.

Figure 8:
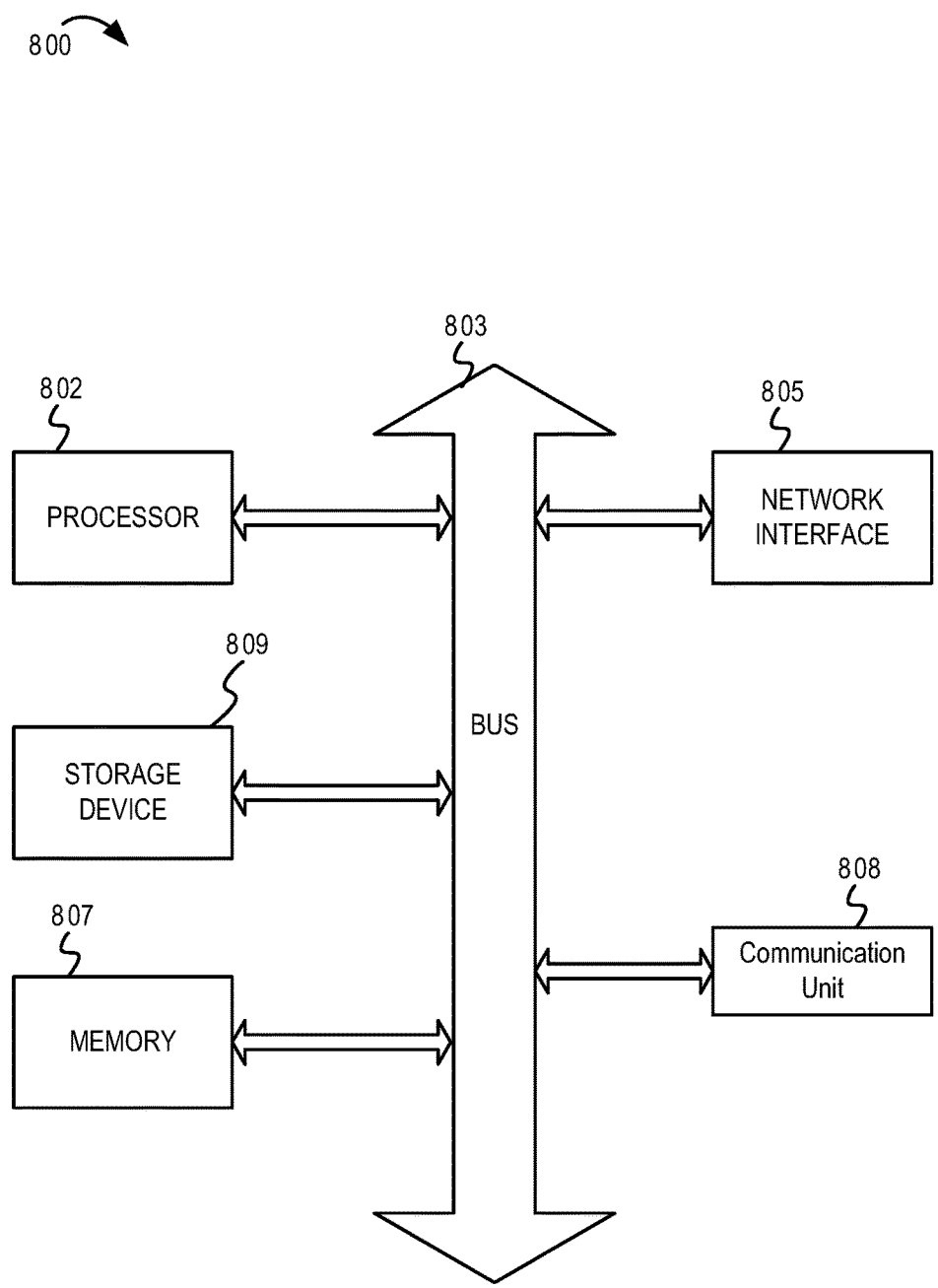
FIG. 8 depicts a block diagram of a device that implements power management, according to some embodiments.

FIG. 8 depicts a block diagram of a device that implements power management, according to some embodiments. A device 800 may be embedded in another electronic device (e.g., a personal computer (PC), a laptop, a netbook, a mobile phone, a personal digital assistant (PDA), or other electronic system). The device 800 includes a processor 802 (possibly including multiple processors, multiple cores, multiple nodes, and/or implementing multi-threading, etc.). The device 800 includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The device 800 also includes a bus 803 (e.g., PCI, ISA, PCI-Express, HyperTransport®, Infini-Band®, NuBus, etc.), a network interface 805 (e.g., an ATM interface, an Ethernet interface, a Frame Relay interface, SONET interface, wireless interface, etc.), and a storage device(s) 809 (e.g., optical storage, magnetic storage, etc.).

The device 800 also includes a communication unit 808. The communication unit 808 can include the components shown in the communication device 101 of FIG. 1 that would implement the functionality described above in FIGS. 1-7. Any of the functionality in the communication unit 808 may be partially (or entirely) implemented in hardware and/or on the processor 802. For example, the functionality may be implemented with an application specific integrated circuit, in logic implemented in the processor 802, in a co-processor on a peripheral device or card, etc. Further, realizations may include fewer or additional components not illustrated in FIG. 8 (e.g., video cards, audio cards, additional network interfaces, peripheral devices, etc.). The processor 802, the storage device 809, the memory 807, and the network interface 805 are coupled to the bus 803. Although illustrated as being coupled to the bus 803, the memory 807 may be coupled to the processor 802.

While the embodiments are described with reference to various implementations and exploitations, it will be understood that these embodiments are illustrative and that the scope of the inventive subject matter is not limited to them. In general, techniques for implementing power management as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for reducing power consumption in a communication device, the method comprising:
    determining, by the communication device, that a packet transmitted on a communication medium is not intended for the communication device;
    determining a length of the packet based on a length field in a preamble of the packet;
    estimating a time to process the packet based at least in part on the length;
    if the length is greater than a first threshold but less than a second threshold, selecting a first group of components of the communication device to which to reduce power, wherein the first group of components includes a radio transmission unit, a radio receiver unit and a clock in the physical layer of the communication device;
    if the length is greater than the second threshold, selecting a second group of components of the communication device to which to reduce power, wherein the second group of components includes a radio transmission unit, a radio receiver unit, a synthesizer and a clock in the physical layer of the communication device; and
    reducing power to the selected group of components,
    wherein the first threshold is related to a time to process a packet of a first length, the second threshold is related to a time to process a packet of a second length and the second length is greater than the first length.

2. The method of claim 1, wherein reducing power to the selected group of components in the communication device is based at least in part on a signal strength associated with the packet.

3. The method of claim 1, wherein reducing power to the selected group of components in the communication device is based at least in part on a determination by the communication device that a destination address in the packet is different than an address of the communication device.

4. The method of claim 3, wherein the address of the communication device is a partial AID assigned to the communication device.

5. A communication device capable of reducing power consumption, the communication device comprising:
    a network interface having components including a radio receiver unit, a radio transmission unit, and a synthesizer; and
    a processor communicatively coupled to the network interface, the processor configured to execute instructions to cause the communication device to:
        determine that a packet transmitted on a communication medium is not intended for the communication device;
        determine a length of the packet based on a length field in a preamble of the packet;
        estimate a time to process the packet based at least in part on the length;
        if the length is greater than a first threshold but less than a second threshold, select a first group of components of the communication device to which to reduce power, wherein the first group of components includes the radio transmission unit, the radio receiver unit and a clock in the physical layer of the communication device;
        if the length is greater than the second threshold, select a second group of components of the communication device to which to reduce power, wherein the second group of components includes the radio transmission unit, the radio receiver unit, the synthesizer and a clock in the physical layer of the communication device; and
        reduce power to the selected group of components,
        wherein the first threshold is related to a time to process a packet of a first length, the second threshold is related to a time to process a packet of a second length and the second length is greater than the first length.

6. The communication device of claim 5, wherein reduce power to the selected group of components in the communication device is based at least in part on a signal strength associated with the packet.

7. The communication device of claim 5, wherein reduce power to the selected group of components in the communication device is based at least in part on a determination by the processor that a destination address in the packet is different than address of the communication device.

8. The communication device of claim 7, wherein the address of the communication device is a partial AID assigned to the communication device.

9. A non-transitory computer readable medium having instructions stored therein which, when executed by a processor of a communication device, cause the communication device to:
- determine that a packet transmitted on a communication medium is not intended for the communication device;
- determine a length of the packet based on a length field in a preamble of the packet;
- estimate a time to process the packet based at least in part on the length;
- if the length is greater than a first threshold but less than a second threshold, select a first group of components of the communication device to which to reduce power, wherein the first group of components includes a radio transmission unit, a radio receiver unit and a clock in the physical layer of the communication device;
- if the length is greater than the second threshold, select a second group of components of the communication device to which to reduce power, wherein the second group of components includes a radio transmission unit, a radio receiver unit, a synthesizer and a clock in the physical layer of the communication device; and
- reduce power to the selected group of components,
- wherein the first threshold is related to a time to process a packet of a first length, the second threshold is related to a time to process a packet of a second length and the second length is greater than the first length.

10. The non-transitory computer readable medium of claim 9, wherein reduce power to the selected group of components in the communication device is based at least in part on a signal strength associated with the packet.

11. The non-transitory computer readable medium of claim 9, wherein reduce power to the selected group of components in the communication device is based at least in part on a determination by the communication device that a destination address in the packet is different than an address of the communication device.

12. The non-transitory computer readable medium of claim 11, wherein the address of the communication device is a partial AID assigned to the communication device.

13. A system for reducing power consumption in a communication device, the system comprising:
- means for determining that a packet transmitted on a communication medium is not intended for the communication device;
- means for determining a length of the packet based on a length field in a preamble of the packet;
- estimate a time to process the packet based at least in part on the length;
- if the length is greater than a first threshold but less than a second threshold, selecting a first group of components of the communication device to which to reduce power, wherein the first group of components includes a radio transmission unit, a radio receiver unit and a clock in the physical layer of the communication device;
- if the length is greater than the second threshold, selecting a second group of components of the communication device to which to reduce power, wherein the second group of components includes a radio transmission unit, a radio receiver unit, a synthesizer and a clock in the physical layer of the communication device; and
- means for reducing power to the selected group of components,
- wherein the first threshold is related to a time to process a packet of a first length, the second threshold is related to a time to process a packet of a second length and the second length is greater than the first length.

14. The system of claim 13, wherein reducing power to the selected group of components in the communication device is based at least in part on a signal strength associated with the packet.

15. The system of claim 13, wherein reducing power to the selected group of components in the communication device is based at least in part on a determination by the communication device that a destination address in the packet is different than an address of the communication device.

16. The system of claim 15, wherein the address of the communication device is a partial AID assigned to the communication device.

* * * * *